US010853366B2

(12) United States Patent
De Smet et al.

(10) Patent No.: US 10,853,366 B2
(45) Date of Patent: Dec. 1, 2020

(54) COOPERATIVE EXPRESSION VISITORS

(71) Applicant: Microsoft Technology Licensing, LLC, Redmond, WA (US)

(72) Inventors: Bart De Smet, Bellevue, WA (US); Eric Anthony Rozell, Somerville, MA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1216 days.

(21) Appl. No.: 14/955,860

(22) Filed: Dec. 1, 2015

(65) Prior Publication Data
US 2017/0154076 A1 Jun. 1, 2017

(51) Int. Cl.
*G06F 16/2453* (2019.01)
*G06F 16/22* (2019.01)
*G06F 16/2455* (2019.01)
*G06F 16/835* (2019.01)

(52) U.S. Cl.
CPC .... *G06F 16/24545* (2019.01); *G06F 16/2255* (2019.01); *G06F 16/2455* (2019.01); *G06F 16/24534* (2019.01); *G06F 16/835* (2019.01)

(58) Field of Classification Search
CPC ............ G06F 16/2246; G06F 16/2255; G06F 16/24545; G06F 16/2455; G06F 16/24578
USPC ................................. 707/769, 770
See application file for complete search history.

(56) References Cited

U.S. PATENT DOCUMENTS

| 6,496,689 | B1* | 12/2002 | Keller ............... H04M 15/28 455/406 |
| 6,721,807 | B2 | 4/2004 | Vlissides |
| 7,076,766 | B2 | 7/2006 | Wirts et al. |
| 7,739,219 | B2 | 6/2010 | Liu et al. |
| 8,166,155 | B1* | 4/2012 | Rachmeler .......... G06F 11/3438 709/224 |
| 8,255,883 | B2 | 8/2012 | Sceppa et al. |
| 2004/0098229 | A1* | 5/2004 | Error .................. H04L 67/14 702/186 |
| 2004/0194072 | A1* | 9/2004 | Venter .................. G06F 8/423 717/140 |

(Continued)

FOREIGN PATENT DOCUMENTS

WO    2007000015 A1    1/2007

OTHER PUBLICATIONS

Krishnamoorthi, Anand Shankar, "Cooperative Visitor: A Template Technique for Visitor Creation", Retrieved from <<https://web.archive.org/web/20070715132512/http://www.artima.com/cppsource/cooperative_visitor.html>>, Jul. 11, 2007, 13 Pages.

(Continued)

*Primary Examiner* — James Trujillo
*Assistant Examiner* — Fariborz Khoshnoodi

(57) ABSTRACT

In non-limiting examples of the present disclosure, systems and methods for rewriting expressions utilizing cooperative visitors are provided. A data request may be received by a computing device, which may then be represented in a data structure, e.g., an expression tree, representative of the data request. A node within the data structure representative of the data request may be visited. Metadata associated with at least one cooperative visitor may be extracted from the node, and the node may then be transformed by applying the at least one cooperative visitor to the node.

18 Claims, 8 Drawing Sheets

(56) References Cited

U.S. PATENT DOCUMENTS

| | | | | |
|---|---|---|---|---|
| 2005/0078854 | A1* | 4/2005 | Shikano | G06K 9/00664 |
| | | | | 382/103 |
| 2005/0264581 | A1* | 12/2005 | Patrick | H04L 65/4076 |
| | | | | 345/594 |
| 2008/0091409 | A1* | 4/2008 | Anderson | G06F 8/427 |
| | | | | 704/9 |
| 2012/0304069 | A1 | 11/2012 | Zhang et al. | |
| 2013/0117326 | A1 | 5/2013 | De Smet et al. | |
| 2014/0067871 | A1 | 3/2014 | Meek et al. | |
| 2015/0100406 | A1* | 4/2015 | Klimetschek | G06Q 30/0242 |
| | | | | 705/14.41 |
| 2015/0106078 | A1* | 4/2015 | Chang | G06F 16/35 |
| | | | | 704/9 |

OTHER PUBLICATIONS

"International Search Report and Written Opinion Issued in PCT Application No. PCT/US2016/062633", dated Feb. 23, 2017, 17 Pages.

"Second Written Opinion Issued in PCT Application No. PCT/US2016/062633", dated Oct. 25, 2017, 8 Pages.

"International Preliminary Report on Patentability Issued in PCT Application No. PCT/US2016/062633", dated Jan. 8, 2018, 9 Pages.

Horsfall, et al., "Verifying the reflective visitor pattern", In Proceedings of the 14th Workshop on Formal Techniques for Java-like Programs, Jun. 12, 2012, 8 pages.

"Visitor: adding more types via inheritance", Available at: http://stackoverflow.com/questions/6334653/visitor-adding-more-types-via-inheritance, Retrieved on Jul. 27, 2015, 3 pages.

Devlake; "Visitor Design Pattern", Available at: http://www.codeproject.com/Articles/186185/Visitor-Design-Pattern, May 4, 2011, 6 pages.

"The Visitor pattern and multiple dispatch", Available at: http://blogs.msdn.com/b/devdev/archive/2005/08/29/457798.aspx, Aug. 29, 2005, 4 pages.

Palacz, et al., "Engineering a customizable intermediate representation", In Proceedings of the workshop on Interpreters, virtual machines and emulators, Jun. 12, 2003, 10 pages.

Cacho, et al., "Composing Design Patterns: A Scalability Study of Aspect-Oriented Programming", In Proceedings of the 5th international conference on Aspect-oriented software development, Mar. 20, 2006, 13 pages.

\* cited by examiner

COOPERATIVE EXPRESSION VISITORS

BACKGROUND

Requests for data may take many forms including requests for information from one computing device to another, automated software updates, user implemented requests (e.g., queries) for data from servers or other data repositories, etc. For example, data may be retrieved from a server or other computing device after receiving a request to access information from a website, to update files related to a software update, or automated firmware updates. Such data requests are generally composed of expressions that are written in a language that declaratively specifies what is to be retrieved. Such expressions are typically processed by a data request processor, which is used to determine the data request's execution plan, that is, the sequence of steps that will be taken to retrieve the requested data. Within this data retrieval framework, operators may be utilized to map to lower-level language constructs and/or expression trees, making the process of data retrieval more efficient.

Prior to running a received request for data it is often times desirable to modify the structure of one or more expressions contained within that data request. Expression trees are typically built in an immutable fashion (i.e., they cannot be modified directly), and therefore modifications to the expressions contained therein may be manipulated using a variety of recursive patterns. One such commonly used pattern employs a technique whereby an existing expression tree is copied and modified by utilizing a visitor which traverses the expression tree and processes the sub-expressions contained therein as it is traversed. However, the traditional rewrite and expression analysis mechanisms employed by visitors is limited in that only through inheritance and polymorphism can the behavior of visitors be modified to affect the traversal and mutation of a tree's data structure, which can be limiting, especially in programming languages without multiple inheritance.

It is desirable to provide mechanisms by which additional modifications to a data structure may be modified to provide a more decentralized expression rewrite process such that looser coupling and a higher degree of extensibility is accomplished. It is with respect to this general technical environment that aspects of the present technology disclosed herein have been contemplated. Furthermore, although a general environment and relatively specific problems have been discussed, it should be understood that the examples described herein should not be limited to the general environment or to solving the specific problems identified in the background.

SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

Non-limiting examples of the present disclosure describe systems, methods, and techniques that enable cooperative expression visitors (hereinafter "cooperative visitors") to modify expressions contained within received data requests. A data request may be received, and one or more expressions for retrieving data associated with the request, e.g., as represented by one or more nodes of an expression tree or other data structure, may be traversed and modified by a visitor. Upon traversing one or more nodes, metadata associated with at least one cooperative visitor may be extracted from the one or more nodes and the expression within the one or more nodes may then be transformed utilizing at least one cooperative visitor that is, for example, accessed from a storage repository.

BRIEF DESCRIPTION OF THE DRAWINGS

Non-limiting and non-exhaustive examples are described with reference to the following figures.

DETAILED DESCRIPTION

Figure 1:
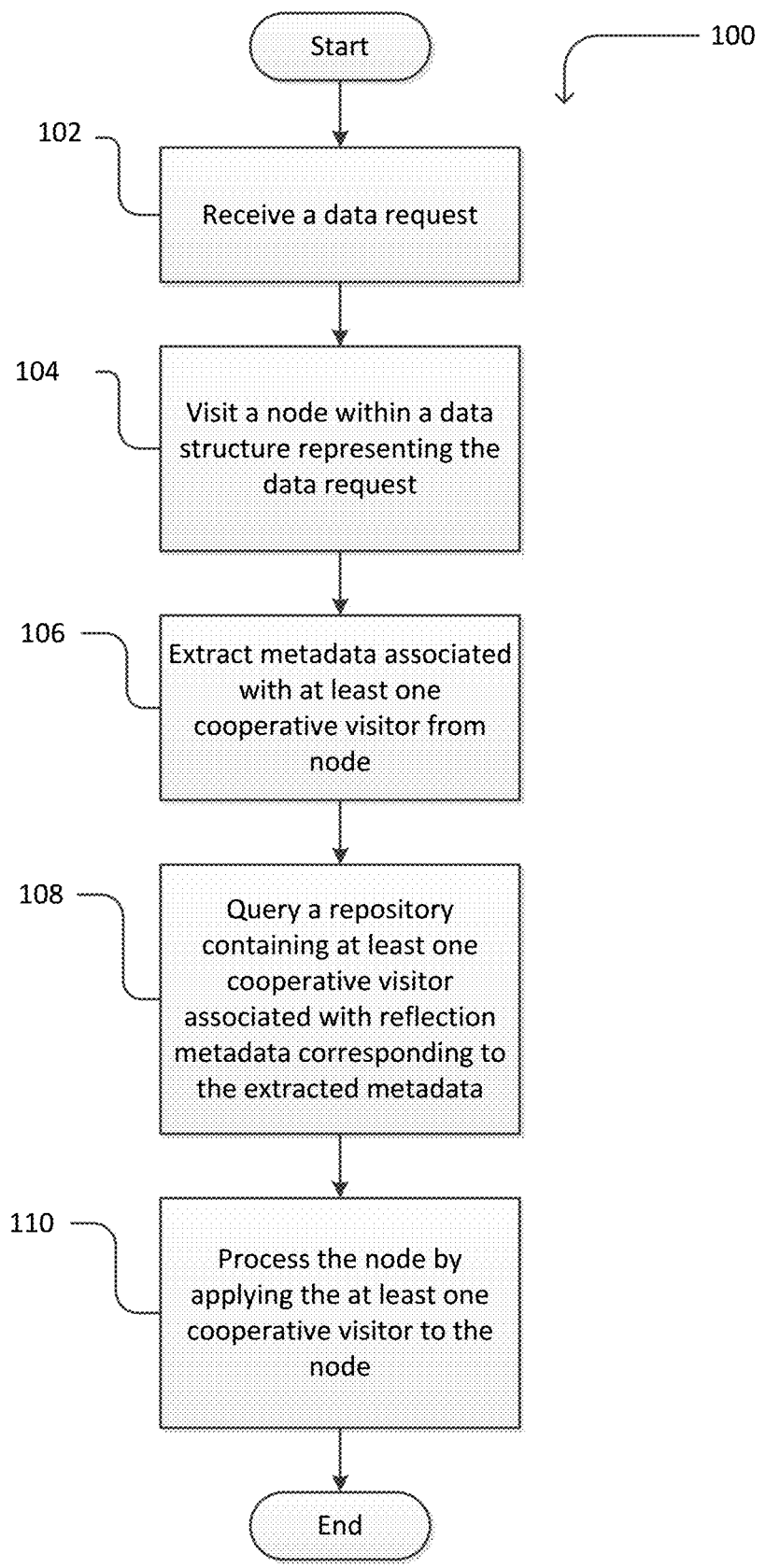
FIG. 1 is an exemplary method for applying cooperative visitors.

Various aspects are described more fully below with reference to the accompanying drawings, which form a part hereof, and which show specific exemplary aspects. However, examples may be implemented in many different forms and should not be construed as limited to the examples set forth herein. Accordingly, examples may take the form of a hardware implementation, or an entirely software implementation, or an implementation combining software and hardware aspects. The following detailed description is, therefore, not to be taken in a limiting sense.

Data is generally retrieved from a database using data requests composed of expressions that are written in a language that declaratively specifies what is to be retrieved. Such expressions are typically processed by a data request processor, which is used to determine the data request's execution plan, that is, the sequence of steps that will be taken to retrieve the requested data. Within this data retrieval framework, data request operators (e.g., query operators) may be mapped onto expression trees, making the process of data retrieval more efficient.

What follows is a description relating to traditional expression tree utilization. However, as will be understood by those of skill in the art, other simplified data structures may be modified according to aspects described herein. The description is not intended to limit the scope of the claims, but rather to facilitate clarity and understanding regarding aspects of the disclosure.

Expression trees represent code in a tree-like structure composed of nodes, where each node within the tree-like data structure is an expression—for example a method call or a binary operation such as x<y. Expression trees are typically constructed using subtrees such that various different subtrees can be combined into a larger tree.

Expression trees are useful in compiling and running code represented by the tree structure and reducing memory storage costs associated with processing a large number of queries that may share certain features that overlap within their data structure. This enables dynamic modification of executable code, the execution of queries in various databases, and the creation of dynamic queries. These methods commonly operate on sequences, where a sequence is an object whose type implements the IEnumerable<T> interface or the IQueryable<T> interface; however, as will be well understood by those of skill in the art, such methods may also include real-time sequences, e.g., IObservable<T>, or other expressions written in a variety of programming languages. The standard query operators provide query capabilities including filtering, projection, aggregation, and sorting, among others.

Standard query operators differ in the timing of their execution, depending on whether they return a singleton value or a sequence of values. Those methods that return a singleton value (for example, Average and Sum) execute immediately. Methods that return a sequence defer the query execution and return an enumerable object. Standard query operator methods that perform aggregation operations include: Aggregate, which performs a custom aggregation operation on the values of collection; Average, which calculates the average value of a collection of values; Count, which counts the elements in a collection, optionally only those elements that satisfy a predicate function; LongCount, which counts the elements in a large collection, optionally only those elements that satisfy a predicate function; Min, which determines the minimum value in a collection; and Sum, which calculates the sum of the values in a collection. While specific operators are described herein, one of skill in the art will appreciate that other operators (e.g., Max, Min, etc.) may be employed with the aspects disclosed herein without departing from the scope of this disclosure.

In the case of methods that operate on in-memory collections, the returned enumerable object may capture the arguments that were passed to the method. When that object is enumerated, the logic of the query operator is employed and the query results are returned. Alternatively, methods may be employed which do not implement querying behavior, but instead build an expression tree that represents a query.

Certain queries, such as Language-Integrated Query (LINQ), not only provide a way of retrieving data, but also provide a powerful tool for transforming data. By using such queries, a source sequence may be utilized as input and modified in various ways to create a new output sequence. Such queries allow for performing functions such as merging multiple input sequences into a single output sequence that has a new name; creating output sequences whose elements consist of only one or several properties of each element in the source sequence; creating output sequences whose elements consist of the results of operations performed on the source data; creating output sequences in a different format; and creating output sequences that contain elements from more than one input sequence. Such operators are typically mapped onto expression trees.

According to aspects disclosed herein data requests may be initiated by automated requests from one computing device to another computing device such as a server or other data storage repository. Such data requests may relate to software updates, firmware updates and the like. Data requests may also encompass user-initiated queries routed through a distributed network system such as the Internet or an Intranet.

According to aspects of the disclosure, utilization of cooperative visitors may be useful in providing mechanisms for modifying expressions contained within data structures (e.g., expression trees) corresponding to data requests. For example, by providing a repository of cooperative visitors associated with metadata that may be extracted from nodes within an expression tree representative of one or more data requests, the expression tree structure may be modified by performing rewrites utilizing cooperative visitors that are specified in extracted metadata associated with nodes of the expression tree, providing a more decentralized expression rewrite process such that looser coupling and a higher degree of extensibility is accomplished.

According to some aspects of this disclosure, expression trees, or other data structures corresponding to data requests, may be modified by compiling repositories of cooperative visitors with reflective metadata corresponding to expressions within the data structures. For example, in the case of a data request received from a user requesting access to data from a website, an expression tree constructed from the data request may include nodes (and the expressions represented thereby), which contain or are associated with metadata that can be used to determine what customized cooperative visitors may transform the expressions represented by their respective nodes as well as the structure of the expression tree as a whole.

Prior solutions were limited in that visitors could only participate in the traversal and mutation of a tree's data structure through the mechanisms of inheritance and polymorphisms, which can be limiting, especially when performed in programming languages without multiple inheritance, thereby limiting the scope of modifications that could be accomplished prior to or at runtime. Because of this, effectuating modifications to a data request's structure utilizing the methods and techniques of prior solutions could only be accomplished in a tightly coupled manner. The aspects disclosed herein provide numerous technical benefits over prior solutions. For example, according to non-limiting aspects described herein, cooperative visitors may be used for expression analysis or to rewrite expressions while providing a more decentralized expression rewrite process such that looser coupling and a higher degree of extensibility may be accomplished than with previous methods.

In non-limiting examples of the present disclosure, cooperative visitors may modify expressions contained within received data requests. By way of example, a data request, e.g., a query generated by a user, may be received, and one or more expressions contained within that data request, as represented by one or more nodes of a tree, may be traversed and modified by a visitor. Upon traversing the one or more nodes, metadata associated with at least one cooperative visitor may be extracted from the one or more nodes and the expressions associated with the one or more nodes may then be transformed utilizing the at least one cooperative visitor that is accessed from a storage repository and has reflective metadata associated with the extracted metadata from the one or more nodes. According to an additional example, hash code for one or more cooperative visitors may be stored in a repository and accessed from one or more nodes of a tree when processing a data request.

According to additional non-limiting examples, various properties of expression tree nodes may be used to select appropriate cooperative visitors. For example, a hashed representation of an expression may be utilized, whereby a small hash value may indicate a small expression tree (e.g., leaf node), and a large hash value may indicate a larger, deeper expression tree. According to such examples, it may be desirable to use one kind of cooperative visitor for relatively smaller expression trees, and a second kind of cooperative visitor for larger, deeper expression trees.

According to certain non-limiting examples disclosed herein, the general term "cooperant" may encompass a "cooperative visitor" (i.e., a cooperative visitor being a kind of cooperant). According to examples, a base visitor (i.e., a visitor that initiates the cooperative process), may encounter various kinds of cooperants. As used herein, cooperants commonly are visitors, making them cooperative visitors. However, according to certain examples, cooperants may simply alter or analyze an expression without "visiting" the expression. In accordance with such examples, cooperants may be passive, in which case they would not perform any visitation, but may perform one or more actions upon being invoked without affecting the structure of an initial expression.

According to one example, a data request may be received which contains a simple binary expression tree (e.g., x+y) composed of three nodes—the root node, which is the binary operation (i.e., "+"), and the 2 leaf nodes (i.e., "x" and "y"). In this example, the two leaf nodes would each be associated with their own metadata, individually linked to cooperants. The "x" leaf node may contain metadata associating it with a cooperative visitor. Alternatively, the "y" leaf node may contain metadata associating it with a passive cooperant. According to aspects, upon receiving a data request, a base cooperative visitor may be programmed to perform a depth-first traversal over the expression tree such that after visiting the root node, it would then visit the "x" leaf node. The base cooperative visitor would extract the metadata associated with the "x" leaf node and, after a lookup in a cooperant repository, discover a cooperative visitor that would be applied to "x" leaf node. The base cooperative visitor may then return the resulting expression as a replacement and continue on to the "y" leaf node. Upon traversing the "y" leaf node, the metadata associated with "y" leaf node may encompass a passive cooperant, thereby inducing no change to the expression contained therein; however, a side-effect might result. For example, a string representation of the expression, e.g., "Parameter(Name='y')" may be printed.

According to the modification principles of expression trees as described above, mechanisms may be provided according to aspects of this disclosure by which combinators can be built for transforming expression trees. For example, a library may be constructed that includes standard query operators (SQOs) that may be used to perform transformations on one or more expression trees and their subparts. In accordance with aspects disclosed herein, exemplary combinators for transforming trees may include one or more of the following as set forth in the following table. These combinators are provided by way of example only and it will be understood by those of skill in the art that other combinators may be utilized in various aspects of the present disclosure.

| COMBINATOR | FUNCTION | TRANSFORMATION PERFORMED |
| --- | --- | --- |
| Projection | Select | Projection using "Select" transforms an ITree<T> to an ITree<R>, e.g., to turn values T into Tuple<T, Trivia> |
| Filtering | Where | Filtering using "Where" may be utilized to prune nodes out of an ITree<T>, e.g., to remove redundant computations |
| Sorting | OrderBy | Sorting using "OrderBy" can percolate trees according to "keys" selected for nodes", e.g, to build priority queues |
| Aggregating | Aggregate | Aggregations using "Aggregate" can compute a value over a tree, e.g., the total cost of a tree, a hash code, etc. |
| Grouping | GroupBy | Grouping using "GoupBy" may e utilized to classify tree nodes and build indexes over nodes that have common keys |

As an example, the following function may be utilized to transform a tree of type ITree<T> into an ITree<Tuple<T, int>>, where the integer value associated with the node represents its hash code. A relatively straightforward bottom-up tree visitor can tag intermediate nodes of a tree with their hash code, and roll up this information to parent nodes: ITree<R>Select<T, R>R>(ITree<T>tree, Func<T, R>selector)

According to additional non-limiting examples of the present disclosure, systems, methods and techniques are provided that enable a technique of cooperative expression visitation where various pieces of metadata attributes (compilation units or assemblies, types, members, etc.) can annotate artifacts (including operations such as methods) that provide a visitor with the capability to modify an expression. Accordingly, a data structure itself can dictate the way that expressions contained therein may be rewritten and can inform type authors about ways to participate in their logic.

The concept of cooperative visitors relies heavily on the ability to create reflective pairs of metadata between cooperative visitors within a repository on the one hand, and within the expressions contained within one or more nodes, on the other. Both sets of reflective metadata, that is the metadata on the expression side, and metadata on the cooperative visitor side, may annotate artifacts to their cooperative visitor logic. As referred to herein, artifacts may include anything that supports metadata annotations. For example, in the context of Common Language Runtime (CLR), this may include types, methods, properties, parameters, fields, assemblies and modules.

One advantage of the aspects described herein results from the ability to associate various types of cooperative visitors with the metadata that accompanies the query expressions within nodes of a data structure (e.g., expression tree). That is, a node or expression can be rewritten multiple times by multiple cooperative visitors associated with metadata annotations to that node or expression, to accomplish various customizations prior to or at runtime. For example, one cooperative visitor may be used to rewrite nodes that represent an operator overload for subtraction (e.g., "−") into the combination of addition (e.g., "+") with a negation (e.g., "−"), while another visitor may be used to analyze the same nodes by determining whether the "−" operation could cause overflows, which could result in system failure if performed at runtime.

What follows is a basic description of how cooperative visitors may be written and annotated according to aspects of this disclosure. This description is provided only by way of example and should not be used in a limiting sense.

In order to define a visitor itself, an interface must be provided, such as may implement the IExpressionVisitor interface:

```
[CooperativeVisitorID(someID)]
class MyVisitor : IExpressionVisitor
{
    ...
}
```

In this particular example, specialized logic is not needed, so nothing is overridden and only the annotation on artifacts is used to achieve the visitor's rewrite logic. One of ordinary skill in the art will understand that an attribute (e.g., the unique identifier "someID") has been given to the visitor in the above example. The use of such an identifier is not needed per se, as a fully qualified type name of the visitor may be used to identify it. This may result in coupling that is too tight, and therefore an opaque identifier like a string of a GUID may be chosen for this purpose.

According to certain aspects, the next step in creating a cooperative visitor is to annotate an artifact with the CooperativeVisitor attribute to indicate its participation in the visitor's logic as provided in the example below:

```
class Vector
{
    [CooperativeVisitor(someID, typeof(MyVisitorImpl))]
    public static Vector operator - (Vector v1, Vector v2)
    {
        ...
    }
    class MyVisitorImpl : IExpressionVisitor
    {
        public MyVisitorImpl(Func<Expression, Expression> visit)
        { ... }
        public bool IsStateless { get { ... }}
        public Expression Visit(Expression node) { ... }
    }
}
```

In this example, the method implementing operator "−" has been annotated by a reference to the visitor it provides custom logic for, referred to by "someID". In addition, the implementation of the visitor's custom logic is supplied by "typeof(MyVisitorImpl)". This example implements an IExpressionVisitor and requires a constructor that takes in a delegate to recursively traverse an expression tree. In such an example, it is expected that a cooperative visitor will use the delegate to traverse into child nodes of any tree node it is provided with. The cooperative visitor in this example may provide various services such as detecting whether performing a certain rewrite of a node will cause an infinite loop, and dispatching to other cooperative visitors that may be utilized to visit the same node (before or after it has been rewritten) and modify expressions containing metadata that corresponds to those cooperative visitors.

In this particular case, the Visit method of "MyVisitorImpl" may perform certain checks to determine whether a desired rewrite is safe (e.g., as described above with regard to determining whether performing a certain rewrite of a node will cause an infinite loop). According to another non-limiting example, a check may be performed to determine whether negating a vector may lead to a loss of precision for one reason or another, and if so, necessary rewrites may then be performed and the resulting node could then be returned.

According to additional examples, the lifecycle of a cooperative visitor such as "MyVisitorImpl" may be extended by implementing more specialized interfaces, such as for example, IPreOrderExpressionVisitor or IPostOrderExpressionVisitor interfaces corresponding to pre and post recursion mechanisms, respectively. For example, nodes may be visited prior to recursion or after recursion into child nodes. Additionally, cooperative visitors can be stateful, requiring new instances to be created each time a node with an attribute referring to it is found. If this is not the case (e.g., for an analysis), the same instance of the cooperative visitor may be reused. According to aspects disclosed herein, such cooperative visitors may be made discoverable using properties like "Is Stateless". However, as will be understood by those of skill in the art, "IsStateless" is just one piece of metadata that expression tree visitor engine 611 from FIG. 6 may use to perform the visitor process using discovered cooperants. For example, when discovering a plurality of cooperative visitors for a given node in the tree, expression tree visitor engine 611 may also employ techniques such as ranking to discover the most applicable cooperant, optionally (SHOULD rewrite or CAN BE OPTIONALLY rewritten), etc. This feature serves to further reduce the tight coupling that typically exists between an expression tree and the visitors used to traverse it.

According to one example, a node may describe a function involving a virtual (in the object-oriented sense) member. The node could be annotated with a cooperant that can substitute it for an alternative form. However, an external metadata store may also exist that returns a cooperant for each virtual member that is known to have just a single implementation, i.e., it is a "devirtualizing" rewriter (a common technique in JIT compilers to turn a virtual call into a cheaper direct call, bypassing a v-table). A ranking process could be used according such an example to determine which rewrite to use.

In certain instances it may not always be feasible to extend existing types with cooperative visitor support. For example, a shared library containing expressions that are capable of being rewritten or interpreted in a number of different ways for different expression evaluators would likely produce failure at runtime. According to such an example, it may be desirable to produce a subtract operator for a data type that can be associated with cooperative visitors, but is not associated with a specific cooperative visitor. In such an example, when downstream consumers of the library containing the subtract operator attempt to implement different interpretation strategies, they may do so employing decoupled mechanisms as described more fully herein.

Similarly, it may not be desirable to change a visitor's implementation to have hardcoded knowledge about these types, as in the case of previously disclosed methods as described supra, wherein inheritance and polymorphism are the only mechanisms utilized to implement expression rewriting visitors. In contrast to those previously disclosed methods, non-limiting aspects described herein may apply to situations where at the time a visitor is designed, all of the expression types that the visitor can be applied to may not yet exist. In such examples, as a query language evolves, and new operators emerge, the use of cooperative visitor models as described herein, allows existing, pre-compiled visitors to adapt to new expression node types.

Such tight coupling can lead to static dependencies that require an application or library that has a specialized visitor to always load libraries that contain types it may want to perform analyses for. For example, a "−" rewrite may be written to apply to LatLong coordinate objects which live in a totally different geo-spatial library that is rarely used. As such, utilization of a visitor to perform algebraic rewrites should not require a dependency to a library whose type it may only need rarely.

According to examples, to accommodate for scenarios where existing types need to participate in cooperative visitation of an expression tree, but the visitor itself should not be changed, the metadata discovery may be abstracted out as a repository. In this case, it is possible to discover cooperative visitors at runtime by querying the repository for a given artifact (e.g., types and their members). By default, the data request may look for reflection metadata, and/or it may look elsewhere for that reflection metadata as illustrated by the following exemplary code:

```
interface ICooperativeVisitorRepository
{
    Type[ ] GetVisitors(MemberInfo member);
}
```

In the above example, one of ordinary skill in the art will appreciate that MemberInfo is the base class for all artifacts that support metadata in the CLR, including Type, MethodInfo, etc. By returning an array of visitors, it will be appreciated that multiple sequential analyses or rewrites may be invoked for any given node. For example, certain components (e.g., expression metadata itself or metadata attached to visitor types) may be implemented to select a most desirable or "best" cooperative visitor for an expression type, if multiple visitor types are returned.

According to aspects described herein, strong decoupling may be achieved by utilizing cooperative visitors in traversing an expression tree's data structure. This decoupling property provides benefits but also may pose challenges. Specifically, a cooperant may be implemented as a cooperative visitor, thereby triggering elaborate rewrite schemes that can result in failure at runtime. For example, a visitor's logic may be impaired due to a "bad" cooperant being loaded (e.g., visitors that result in runtime error due to developer errors or malicious interference related to the cooperant and resulting rewrite process). In order to support debugging, e.g., if it is determined that a problem has occurred when a rewrite has been performed, a chain of loaded visitors and control transfers between the top-level visitor and cooperants may be logged. In doing so, the chain of visitation may be logged and recorded such that if failure occurs it is possible to backtrack through that chain and determine where within the chain of visitation an unexpected rewrite that triggered runtime failure, or some other unexpected result, occurred.

It will be understood by one of skill in the art that aspects of the debugging concept described above may be utilized to detect problematic rewrites in environments other than expression trees. For example, a generalized ITree<T> interface may be provided, with a pairing ITreeVisitor<T>. In providing a means for nodes to accept cooperative visitors, those visitors may dispatch into cooperants to handle whatever additional artifacts (e.g., types and their members) they refer to.

In view of the exemplary systems described supra, methodologies that may be implemented in accordance with the disclosed subject matter will be better appreciated with reference to the flowchart of FIG. 1. While for purposes of simplicity of explanation, the methodologies are shown and described as a series of blocks, some blocks may occur in different orders and/or concurrently with other blocks from what is depicted and described herein. Moreover, not all illustrated blocks may be required to implement the methods described hereinafter.

Referring to FIG. 1, an in illustration of a flowchart representing an embodiment of a method 100 for rewriting expressions utilizing cooperative visitors is provided. Flow begins at operation 102 where a data request is received by a computing device. Requests for data may take many forms including requests for information from one computing device to another, automated software updates, user implemented requests (e.g., queries) for data from servers or other data repositories, etc. For example, data may be retrieved from a server or other computing device after receiving a request to access information from a website, to update files related to a software update, or automated firmware updates. Such data requests are generally composed of expressions that are written in a language that declaratively specifies what is to be retrieved. Such expressions are typically processed by a data request processor, which is used to determine the data request's execution plan, that is, the sequence of steps that will be taken to retrieve the requested data. Within this data retrieval framework, operators may be utilized to map to lower-level language constructs and/or expression trees, making the process of data retrieval more efficient. That is, this data retrieval framework for the data request may be represented by a data structure, e.g., an expression tree or other data structure.

Upon receiving the data request flow continues to operation 104 where a node within the data structure representative of the data request, e.g., an expression tree structure, is traversed (or visited) by a visitor. As detailed above, these data structures (e.g., expression trees) are typically built in an immutable fashion (i.e., they cannot be modified directly), and therefore modifications to the expressions contained therein generally require that an existing expression tree be copied and modified by utilizing a visitor which traverses the copied expression tree and processes the expressions contained therein as it is traversed.

Upon traversing the node, flow continues to operation 106 where the visitor extracts metadata associated with at least one cooperative visitor from the node. That is, as described above, the technique of cooperative visitors provides for an extensibility point where various pieces of metadata (compilation units or assemblies, types, members, etc.) can annotate artifacts (including operations such as methods) to provide a visitor with the capability to modify or otherwise analyze an expression. It should be appreciated that many nodes in expression trees can leverage cooperative visitation support. For example, nodes like MethodCall, Binary, and Unary have a MethodInfo associated with them. Other nodes may have a Type property that's relevant, e.g., Unary nodes representing a cast or conversion operation. Depending on the node type, a dispatch operation into a cooperative visitor—through the repository—can be made, as described with reference to operation 108.

Flow continues to operation 108 where a repository is queried for at least one cooperative visitor associated with reflection metadata corresponding to the extracted metadata associated with the node of the one or more nodes within the data structure. The concept of a repository service decouples metadata attributes from their targets. By doing so, this enables a newly created type to be annotated with cooperative visitor attributes, as well as associating existing types with cooperative visitors without the need to recompile the library containing the type. This flexibility allows for the decoupling of type authors from visitor authors while providing the ability to retrofit cooperative visitor logic on existing types and their members.

At operation 110 the node (i.e., the expression(s) contained therein) is processed by the at least one cooperative visitor. For example, the node may be transformed by a rewrite process performed by the at least one cooperative visitor. Alternatively, the at least one cooperative visitor may perform an expression analysis to ensure that the expression(s) will not cause overflow or failure during runtime.

Figure 2:
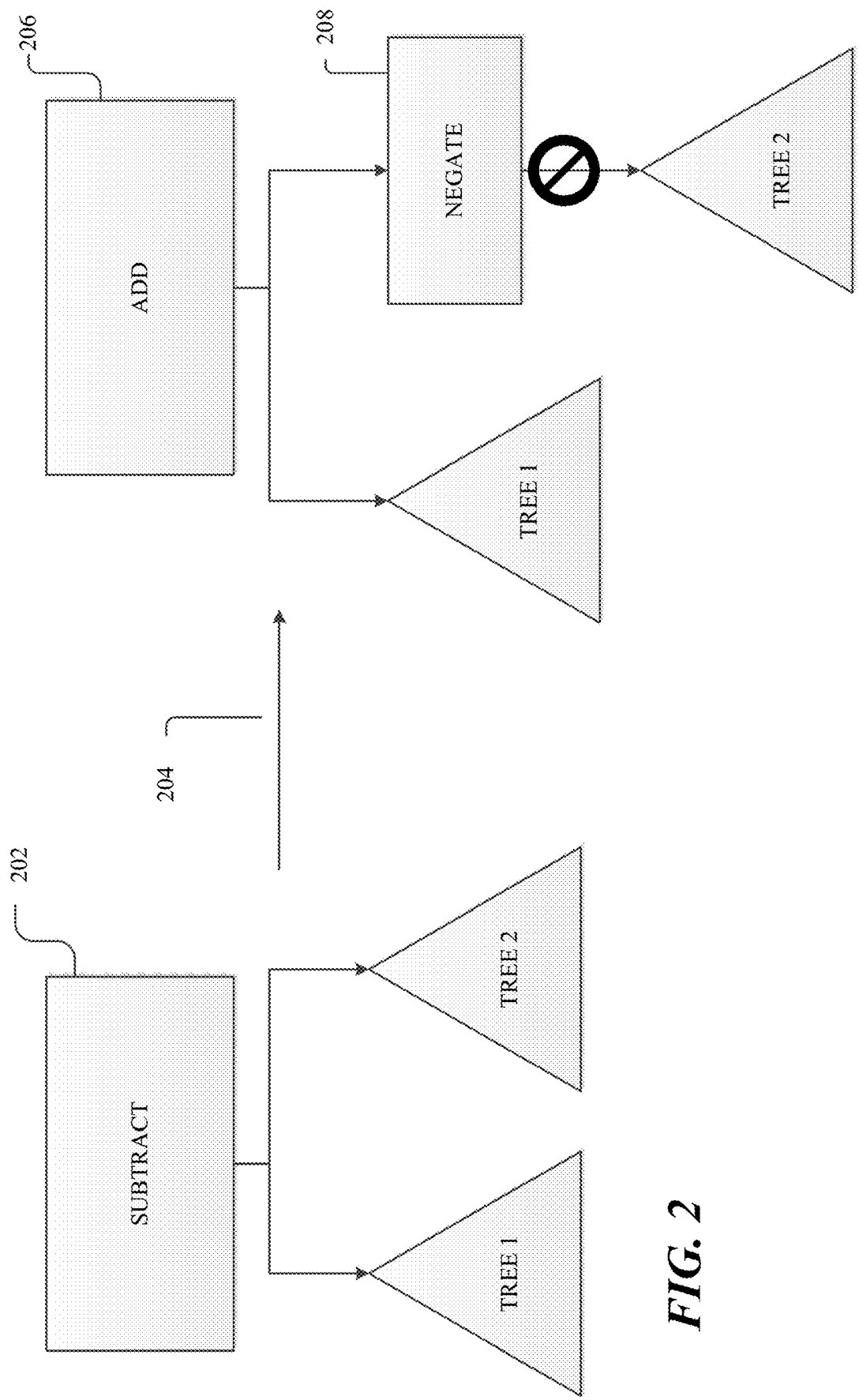
FIG. 2 illustrates a traditional rewrite operation as performed by a classic visitor.

Turning to FIG. 2, a traditional rewrite operation is illustrated as performed by a classic visitor whereby, for example, "a−b" is transformed into "a+(−b)" by way of a unary negation rewrite. A subtract expression 202 is transformed 204 into an add expression 206 and a negate expression 208. However, although such a transformation may be performed for various branches of mathematics without issue, such a transformation is not guaranteed to provide results, which when executed on a computer, provide failsafe results. For example, the negation may cause overflow (e.g., return a result that is too large than that which a given register or storage location can store or represent) or lose precision at runtime, while the subtraction operation would not have caused these issues.

Under the scenario illustrated in FIG. 2, a traditional visitor may not be capable of determining what operations a child node supports, and thus, would be unable to perform certain rewrites without taking a dependency on other libraries, therefore introducing strong coupling. As a specific example, a subtraction 202 of two vector objects may be supported (through operator overloading) but there is no guarantee that the expression will be performed correctly if transformed 204 to perform vector addition 206 or vector negation 208. Accordingly, a need exists for one or more cooperative visitors with logic for performing tasks that are not available to a visitor based on the expression tree.

Figure 3:
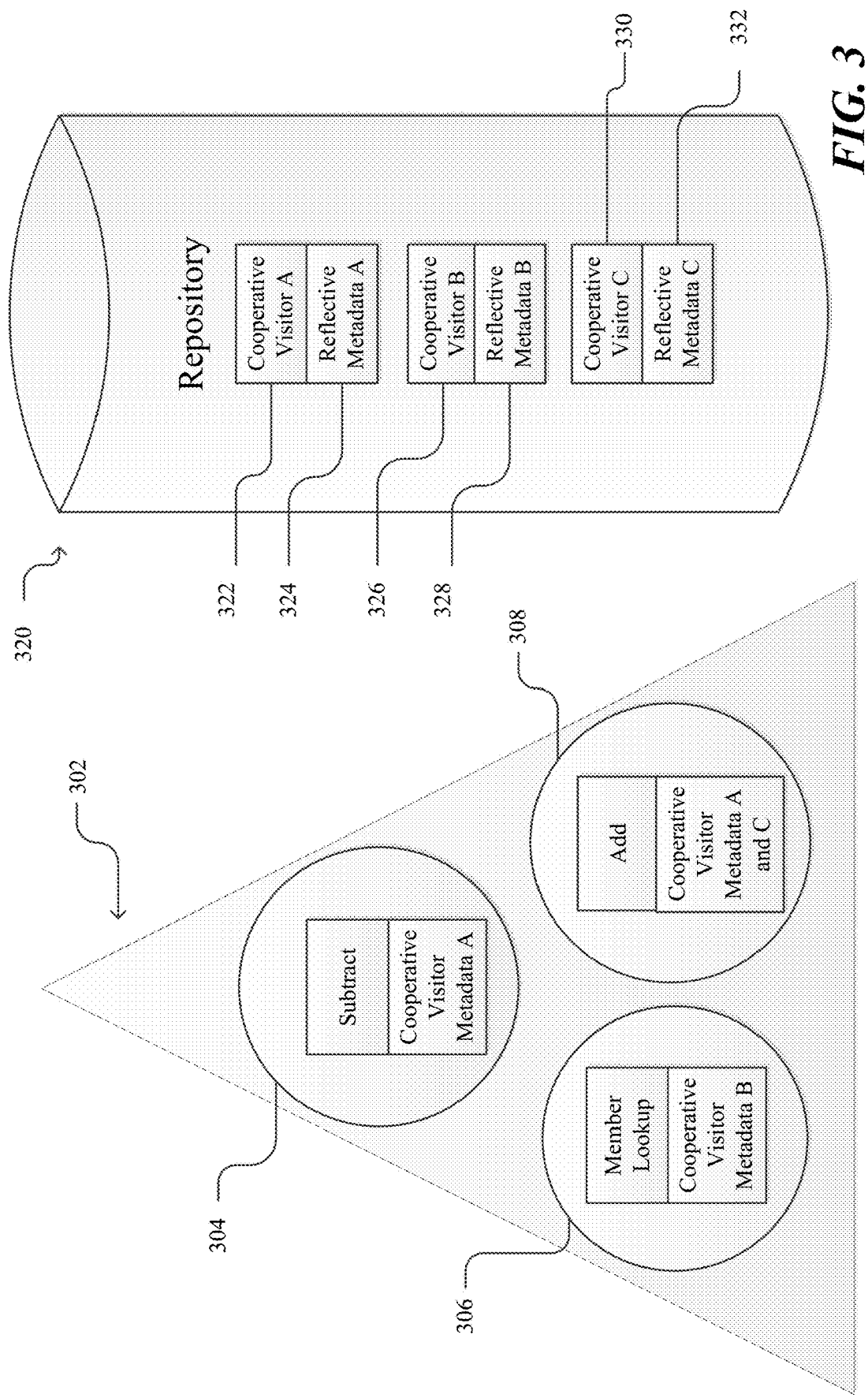
FIG. 3 is a simplified diagram illustrating various aspects by which cooperative visitors may be applied to a tree according to aspects of the present invention.

Turning to FIG. 3, a simplified diagram illustrating various aspects by which cooperative visitors may be applied to a data structure (e.g., expression tree) according to aspects of the present disclosure is provided. As illustrated, a tree 302 representative of a data request is provided, which is comprised of nodes 304, 306 and 308 which each contain an operation (e.g., subtract, member lookup and add) in addition to cooperative visitor metadata corresponding to reflective metadata 324, 328 and 332 associated with cooperative visitors 322, 326 and 330 that are stored in a repository 320.

Upon being traversed by a visitor, Cooperative Visitor Metadata A in node 304 may be extracted and a determination may be made as to whether one or more cooperative visitors 322, 326 and 330 may be used to rewrite the subtract operation within node 304. In aspects, Cooperative Visitor Metadata A may correspond to Reflective Metadata A. In that example, it is determined that Cooperative Visitor A 322, which is annotated with Reflective Metadata A 324, may be utilized to rewrite the subtract operation in node 304. Similarly, node 308 may be rewritten by Cooperative Visitor A 322 and Cooperative Visitor C 330, because Reflective Metadata A 324 (associated with Cooperative Visitor A 322) corresponds to Cooperative Visitor Metadata A and Reflective Metadata C 332 (associated with Cooperative Visitor C 330) corresponds to Cooperative Visitor Metadata C, which cooperative visitor metadata collectively annotate node 308. According to examples, providing mechanisms that allow for customizable visitation of nodes within a data structure, such as an expression tree, runtime errors related to generic transformations can be greatly reduced and/or eliminated entirely.

As should be appreciated with reference to FIG. 3, one or more cooperative visitors may be utilized to process a node based on the metadata annotating the node. That is, the metadata may correspond to reflective metadata associated with one or more cooperative visitors in the repository.

Figure 4:
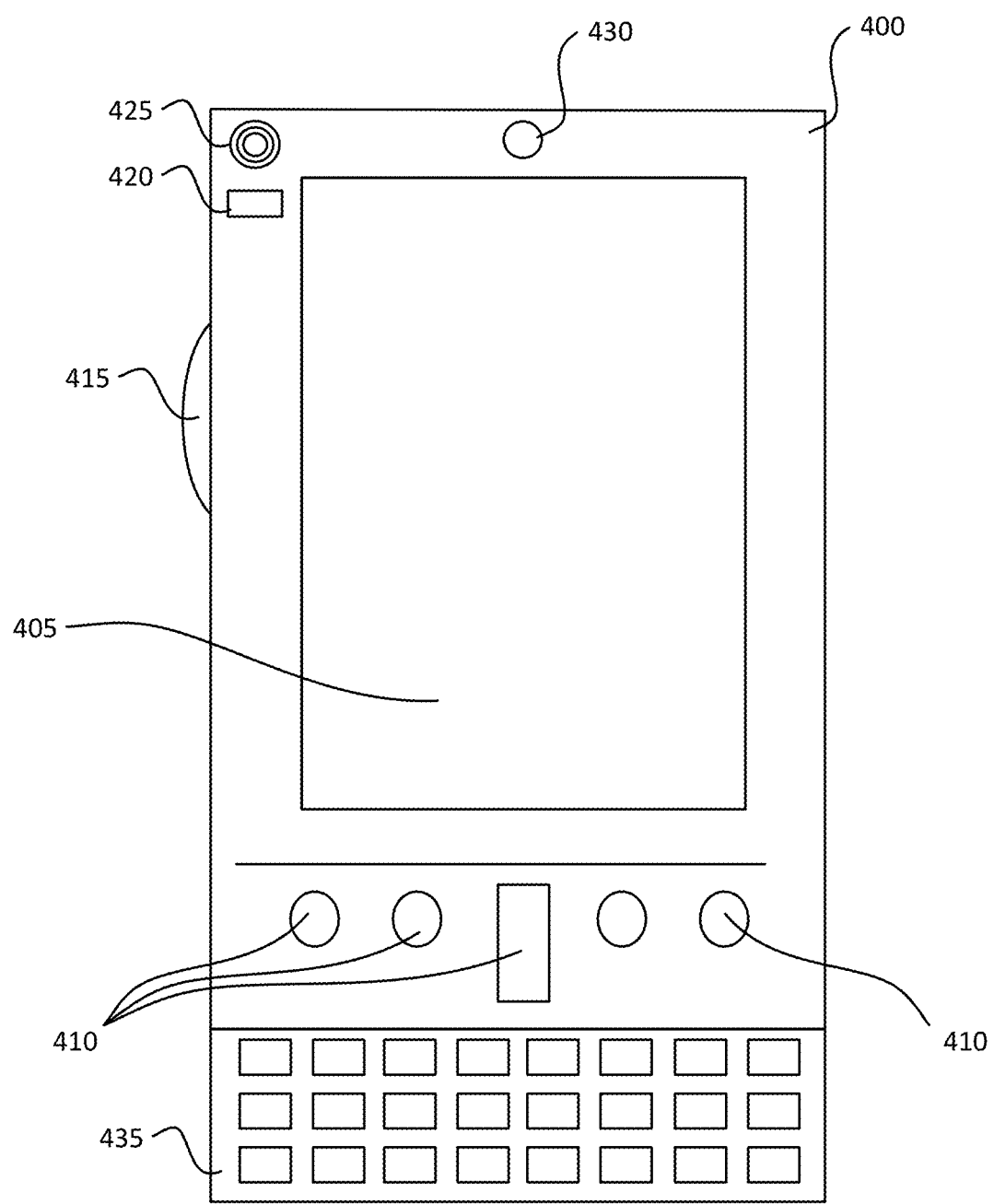
FIG. 4 illustrates a mobile computing device for executing one or more aspects of the present disclosure.
Figure 5:
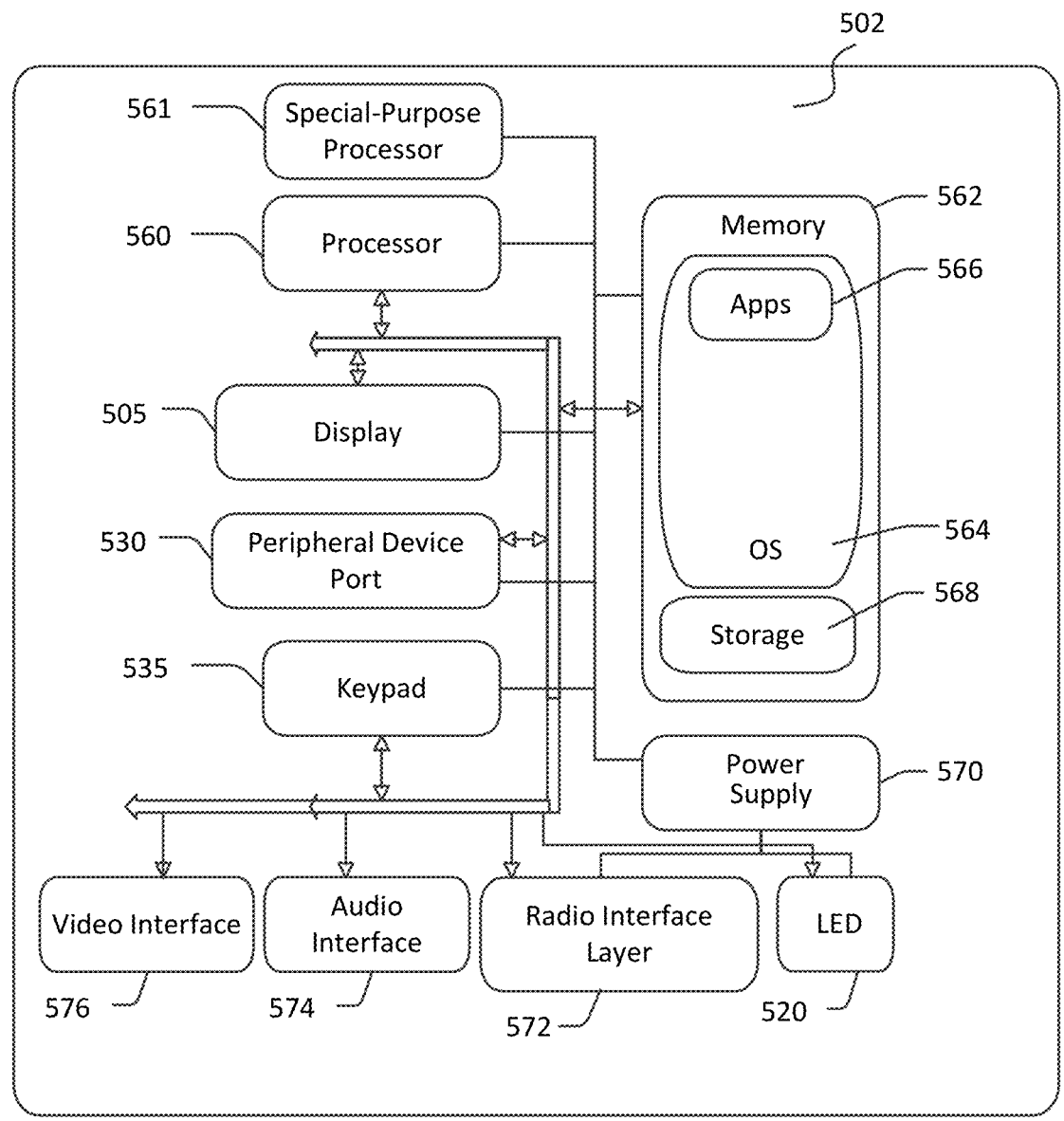
FIG. 5 is a simplified block diagram of a mobile computing device with which aspects of the present invention may be practiced.

FIG. 4 and FIG. 5 illustrate computing device 400, for example, a mobile telephone, a smart phone, a tablet personal computer, a laptop computer, and the like, with which embodiments of the disclosure may be practiced. With reference to FIG. 4, an exemplary mobile computing device 400 for implementing the embodiments is illustrated. In a basic configuration, the mobile computing device 400 is a handheld computer having both input elements and output elements. The mobile computing device 400 typically includes a display 405 and one or more input buttons 410 that allow the user to enter information into the computing device 400. The display 405 of the mobile computing device 400 may also function as an input device (e.g., a touch screen display). If included, an optional side input element 415 allows further user input. The side input element 415 may be a rotary switch, a button, or any other type of manual input element. In alternative embodiments, mobile computing device 400 may incorporate more or less input elements. For example, the display 405 may not be a touch screen in some embodiments. In yet another alternative embodiment, the mobile computing device 400 is a portable phone system, such as a cellular phone. The mobile computing device 400 may also include an optional keypad 435. Optional keypad 435 may be a physical keypad or a "soft" keypad generated on the touch screen display. In various embodiments, the output elements include the display 405 for showing a graphical user interface (GUI), a visual indicator 420 (e.g., a light emitting diode) and/or an audio transducer 425 (e.g., a speaker). In some embodiments, the mobile computing device 400 incorporates a vibration transducer for providing the user with tactile feedback. In yet another embodiments, the mobile computing device 400 incorporates input and/or output ports, such as an audio input (e.g., a microphone jack), an audio output (e.g., a headphone jack), and a video output (e.g., a HDMI port) for sending signals to or receiving signals from an external device. In embodiments, the data output for the processed nodes may be displayed on the display 405.

FIG. 5 is a block diagram illustrating the architecture of one embodiment of a mobile computing device. That is, the mobile computing device 400 can incorporate a system (i.e., an architecture) 502 to implement some embodiments. In one embodiment the system 502 is implemented as a "smart phone" capable of running one or more applications (e.g., browser, e-mail, calendaring, contact managers, messaging clients, games, and media clients/players). In some embodiments, the system 502 is integrated as a computing device, such as an integrated personal digital assistant (PDA) and a wireless phone).

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, diagramming applications, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as e-mail or other messages used by an e-mail application, and the like. A synchronization application (not shown) also resides on the system 502 and is programmed to interact with a corresponding synchronization application resident on a host computer to keep the information stored in the non-volatile storage area 568 synchronized with corresponding information stored in the host computer. As should be appreciated, other applications may be loaded into the memory 562 and run on the mobile computing device 500, including steps and methods of receiving at least one query, visiting a first node within an expression tree composed from the query, and extracting, from the first node, metadata associated with at least one cooperative visitor to the node.

The system 502 has a power supply 570, which may be implemented as one or more batteries. The power supply 570 might further include an external power source, such as an AC adapter or a powered docking cradle that supplements or recharges the batteries.

The system 502 may also include a radio 572 that performs the functions of transmitting and receiving radio frequency communications. The radio 572 facilitates wireless connectivity between the system 502 and the "outside world," via a communications carrier or service provider. Transmissions to and from the radio 572 are conducted under control of the operating system 564. In other words, communications received by the radio 572 may be disseminated to the application programs 566 via the operating system 564, and vice versa. The radio 572 allows the system 502 to communicate with other computing devices such as over a network. The radio 572 is one example of communication media. Communication media may typically be embodied by computer readable instructions, data structures, program modules, or other data in a modulated data signal, such as a carrier wave or other transport mechanism, and includes any information deliver media. The term "modulated data signal" means a signal that has one or more of its characteristics set or changed in such a manner as to encode information in the signal. By way of example, not limitation, communication media includes wired media such as a wired network or direct-wired connection, and wireless media such as acoustic, RF infrared and other wireless media. The term computer readable media is used herein includes both storage media and communication media.

This embodiment of the system 502 provides notifications using the visual indicator 520 that can be used to provide visual notifications and/or an audio interface 574 producing audible notifications via the audio transducer 525. In the illustrated embodiment, the visual indicator 520 is a light emitting diode (LED) and the audio transducer 525 is a speaker. These devices may be directly coupled to the power supply 570 so that when activated, they remain on for a duration dictated by the notification mechanism even though the processor 560 and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present invention, the microphone may also serve as an audio sensor to facilitate control of notifications, as will be described below. The system 502 may further include a video interface 576 that enables an operation of an on-board camera 530 to record still images, video stream, and the like.

A mobile computing device 400 implementing the system 502 may have additional features or functionality. For example, the mobile computing device 400 may also include additional data storage devices (removable and/or non-removable) such as, magnetic disks, optical disks, or tape. Such additional storage is illustrated in FIG. 5 by the non-volatile storage area 568. Computer storage media may include volatile and nonvolatile, removable and non-removable media implemented in any method or technology for storage of information, such as computer readable instructions, data structures, program modules, or other data.

Data/information generated or captured by the mobile computing device 400 and stored via the system 502 may be stored locally on the mobile computing device 400, as described above, or the data may be stored on any number of storage media that may be accessed by the device via the radio 572 or via a wired connection between the mobile computing device 400 and a separate computing device associated with the mobile computing device 400, for example, a server computer in a distributed computing network, such as the Internet. As should be appreciated such data/information may be accessed via the mobile computing device 400 via the radio 572 or via a distributed computing network. Similarly, such data/information may be readily transferred between computing devices for storage and use according to well-known data/information transfer and storage means, including electronic mail and collaborative data/information sharing systems.

One of skill in the art will appreciate that the scale of systems such as system 502 may vary and may include more or fewer components than those described in FIG. 5. In some examples, interfacing between components of the system 502 may occur remotely, for example where components of system 502 may be spread across one or more devices of a distributed network. In examples, one or more data stores/storages or other memory are associated with system 502. For example, a component of system 502 may have one or more data storages/memories/stores associated therewith. Data associated with a component of system 502 may be stored thereon as well as processing operations/instructions executed by a component of system 502

Figure 6:
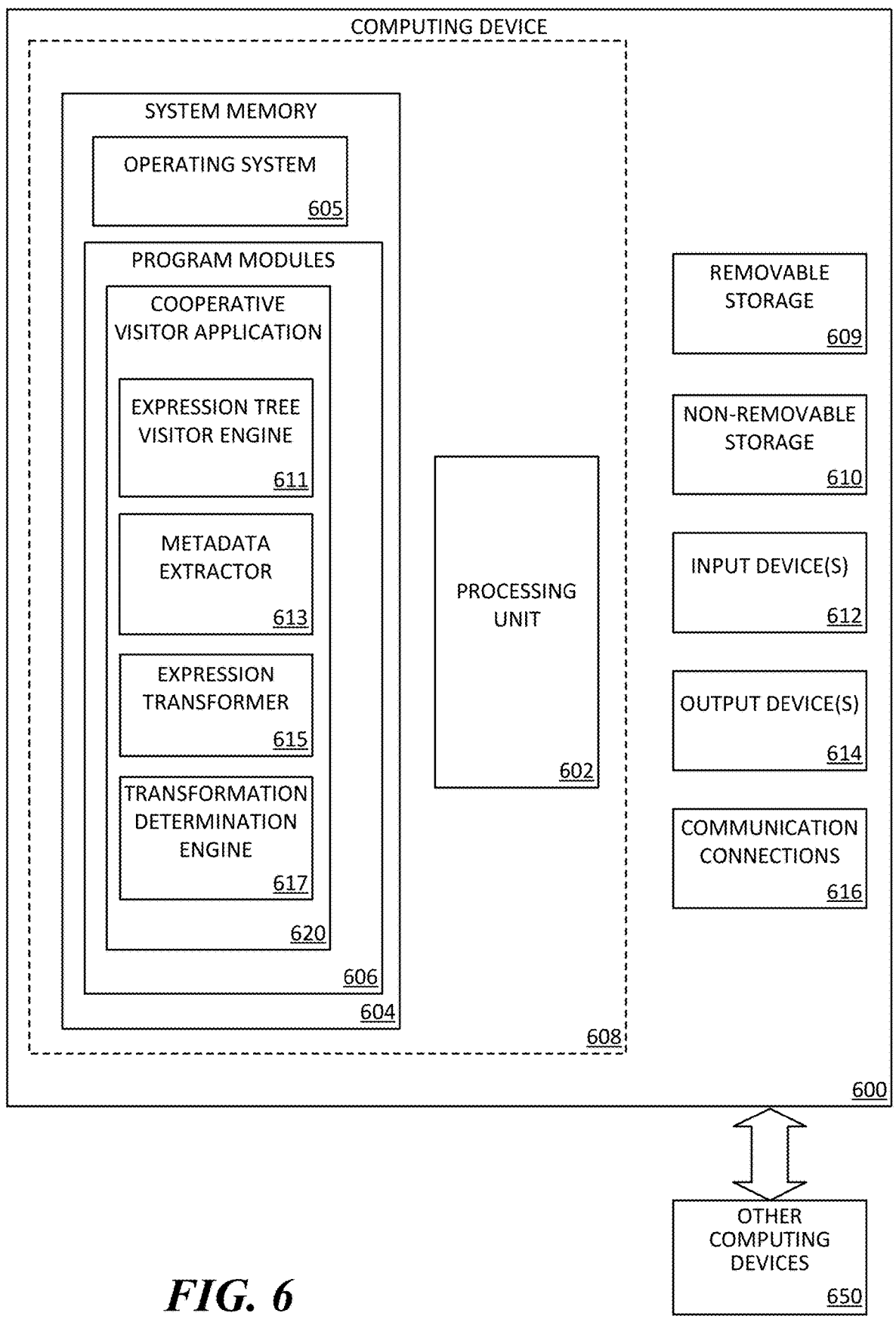
FIG. 6 is a block diagram illustrating physical components (e.g., hardware) of a computing device 600 with which aspects of the disclosure may be practiced.

FIG. 6 is a block diagram illustrating physical components (e.g., hardware) of a computing device 600 with which aspects of the disclosure may be practiced. The computing device components described below may have computer executable instructions for receiving at least one query, visiting a first node within an expression tree composed from the at least one query, extracting from the first node metadata associated with at least one cooperative visitor and transforming the data structure of the first node by applying the at least one cooperative visitor to the node, on a server computing device such as, for example, server 720, including computer executable instructions for cooperative visitor application 620 that can be executed to employ the methods disclosed herein. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for cooperative visitor application 620, such as one or more components in regards to FIG. 6 and, in particular, expression tree visitor engine 611, metadata extractor 613, expression transformer 615, and transformation determination engine 617. The operating system 605, for example, may be suitable for controlling the operation of the computing device 600. Furthermore, embodiments of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606 (e.g., cooperative visitor application 620) may perform processes including, but not limited to, the aspects, as described herein. Other program modules that may be used in accordance with aspects of the present disclosure, and in particular may include expression tree visitor engine 611, metadata extractor 613, expression transformer 615 or transformation determination engine 617, etc.

According to examples, metatada associated with one or more nodes may be extracted by metadata extractor 613 and used by expression tree visitor engine 611, prior to running expression transformer 615 and transformation determination engine 617, to perform a ranking on discovered cooperants.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 700 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 600 may also have one or more input device(s) 612 such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of suitable communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7:
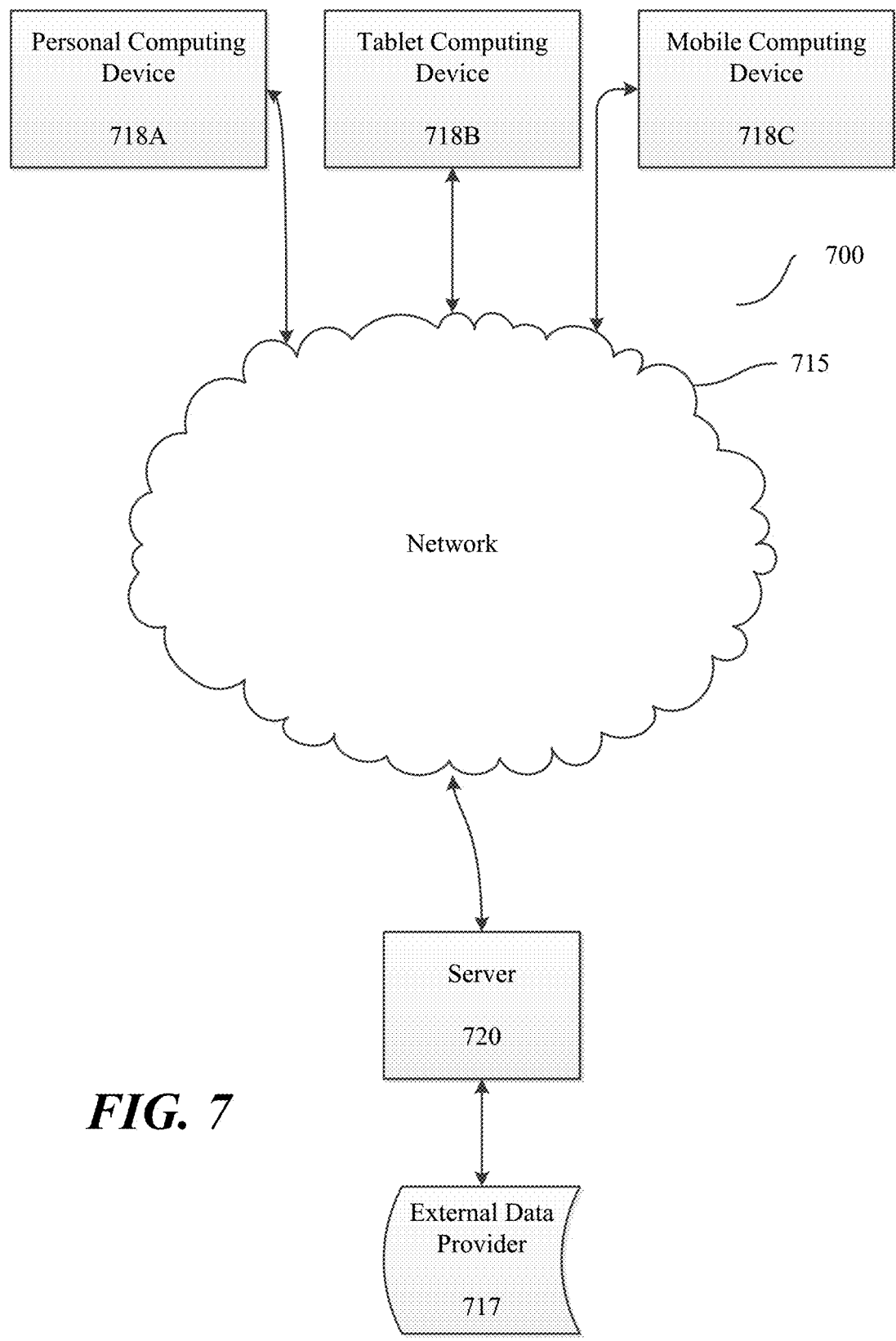
FIG. 7 is a simplified diagram of a distributed computing system in which aspects of the current invention may be practiced.

Turning to FIG. 7, one embodiment of the architecture of a system for rewriting expressions utilizing cooperative visitors and executing the methods described herein to one or more client devices is provided. Content and/or data interacted with, requested, or edited in association with one or more queries may be stored in different communication channels or other storage types. For example, data may be stored using a directory service, a web portal, a mailbox service, an instant messaging store, or a social networking site. The system for rewriting expressions utilizing cooperative visitors and executing the methods described herein may use any of these types of systems or the like for enabling data utilization, as described herein. A computing device 718A, 718B, and/or 718C may provide a request to a cloud/network, which is then processed by a server 720 in communication with an external data provider 717. As one example, the server 717 may provide a data stream in response to processed queries over the web to the computing device 718A, 718B, and or 718C through a network 715. By way of example, the client computing device 718 may be implemented as the system 502, and embodied in a personal computing device 718A, a tablet computing device 718B, and/or a mobile computing device 718C (e.g., a smart phone). Any of these aspects of the system 502 may obtain content from the external data provider 717. In various embodiments, the types of networks used for communication between the computing devices that makeup the present invention include, but are not limited to, an internet, an intranet, wide area networks (WAN), local area networks (LAN), and virtual private networks (VPN). In the present application, the networks include the enterprise network and the network through which the client computing device accesses the enterprise network. In another embodiment, the client network is a separate network accessing the enterprise network through externally available entry points, such as a gateway, a remote access protocol, or a public or private internet address.

Additionally, the logical operations may be implemented as algorithms in software, firmware, analog/digital circuitry, and/or any combination thereof, without deviating from the scope of the present disclosure. The software, firmware, or similar sequence of computer instructions may be encoded and stored upon a computer readable storage medium. The software, firmware, or similar sequence of computer instructions may also be encoded within a carrier-wave signal for transmission between computing devices.

Operating environment 700 typically includes at least some form of computer readable media. Computer readable media can be any available media that can be accessed by processor 560 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 700 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Figure 8:
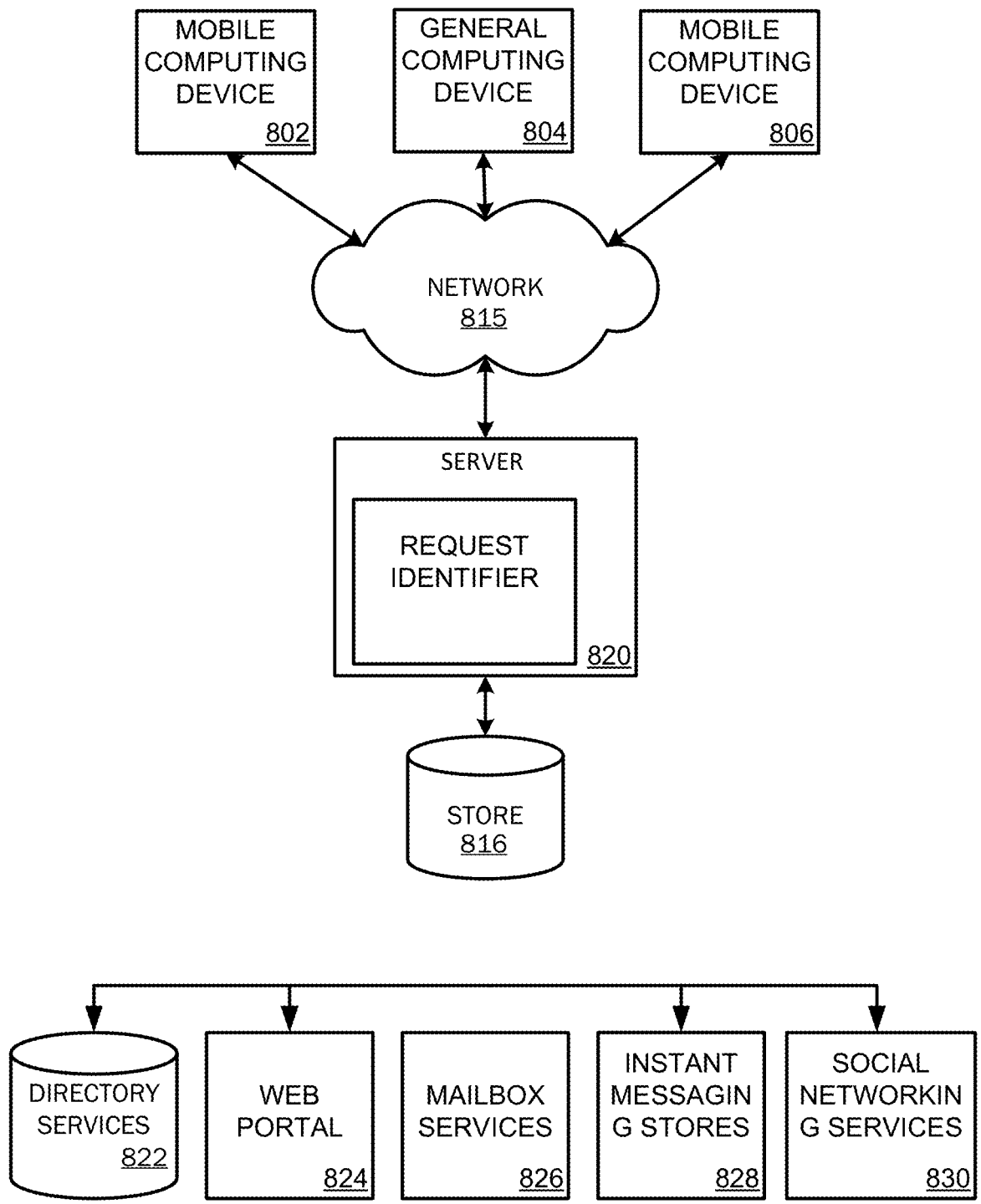
FIG. 8 is a simplified block diagram of a distributed computing system in which aspects of the present invention may be practiced.

FIG. 8 illustrates another example of the architecture of a system for rewriting expressions utilizing cooperative visitors as described above. Queries accessed, interacted with, or edited in association with the processes and/or instructions to perform the methods disclosed herein may be stored in different communication channels or other storage types. For example, various data may be stored using a directory service 822, a web portal 824, a mailbox service 826, an instant messaging store 828, or a social networking site 830. The processes described herein may use any of these types of systems or the like for enabling data utilization, as described herein. A server 820 may provide a storage system for use by clients and operating on general computing device 804 and mobile device(s) 806 through network 815. By way of example, network 815 may comprise the Internet or any other type of local or wide area network, and the clients may be implemented as a computing device embodied in a personal computing device 718A, a tablet computing device 718B, and/or a mobile computing device 718C and 806 (e.g., a smart phone). Any of these embodiments of the client computing device may obtain content from the store 816.

The different aspects described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

As stated above, a number of program modules and data files may be stored in the system memory 562. While executing on processor 560, program modules (e.g., applications, Input/Output (I/O) management, and other utilities) may perform processes including, but not limited to, one or more of the stages of the operational methods described herein such as method 100 illustrated in FIG. 1, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 502 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

We claim:

1. A computer-implemented method comprising:
   receiving a data request;
   accessing a node of a data structure, the data structure representative of the data request;
   extracting metadata from the node;
   determining, from a repository of cooperative visitors, a cooperative visitor based on the metadata, the cooperative visitor comprising logic;
   processing, using the logic of the determined cooperative visitor, the node to generate a rewritten node based on the cooperative visitor;
   generating a chain of visitation comprising a log of control transfers associated with one or more cooperative visitors;
   determining a failure in the processing of the rewritten node; and
   identifying, from the chain of visitation, an error in the log of control transfers, wherein the error is associated with the failure in the processing of the rewritten node.

2. The computer-implemented method according to claim 1, wherein processing the node comprises transforming an expression associated with the node.

3. The computer-implemented method according to claim 1, further comprising:
   querying the repository to identify at least one cooperative visitor associated with reflection metadata corresponding to the extracted metadata associated with the node.

4. The computer-implemented method according to claim 1, further comprising:
   processing the extracted metadata and identifying a plurality of cooperative visitors within the repository based on the extracted metadata.

5. The computer-implemented method according to claim 4, further comprising:
   rewriting an expression associated with the node by applying the plurality of cooperative visitors associated with the extracted metadata.

6. The computer-implemented method according to claim 1, further comprising:
   applying the cooperative visitor to at least one child node of the node.

7. The computer-implemented method according to claim 2, further comprising:
   prior to transforming the expression associated with the node, determining whether transforming the expression associated with the node will result in a loss of precision.

8. The computer-implemented method according to claim 1, further comprising:
   determining whether at least one node of the data structure representative of the data request is suitable for processing by the cooperative visitor.

9. The computer-implemented method according to claim 8, wherein determining whether the at least one node of the data structure representative of the data request is suitable for processing by the cooperative visitor further comprises calculating a computation cost associated with processing the at least one node.

10. A system comprising:
    at least one processor; and
    a memory operatively connected with the at least one processor, the memory comprising computer executable instructions that, when executed by the at least one processor, perform a method comprising:
    receiving a data request;
    generating an expression tree representative of the data request;
    extracting metadata from a node of the expression tree;
    determining, from a repository of cooperative visitors, a cooperative visitor based on the metadata, the cooperative visitor comprising logic; and
    transforming, using the logic of the determined cooperative visitor, an expression associated with the node to generate a transformed node according to the cooperative visitor;
    generating a chain of visitation comprising a log of control transfers associated with one or more cooperative visitors;
    determining a failure in the transformation of the transformed node; and
    identifying, from the chain of visitation, an error in the log of control transfers wherein the error is associated with the failure in the transformation of the transformed node.

11. The system according to claim 10, wherein a hash code associated with the cooperative visitor is stored in the repository.

12. The system according to claim 10, further comprising:
    querying the repository to identify at least one cooperative visitor stored in the repository associated with reflection metadata corresponding to the extracted metadata associated with the node.

13. The system according to claim 10, further comprising:
    processing the extracted metadata and associating a plurality of cooperative visitors within the repository with the extracted metadata.

14. The system according to claim 13, further comprising:
    transforming the expression associated with the node by applying the plurality of cooperative visitors associated with the extracted metadata.

15. The system according to claim 10, further comprising:
    applying the cooperative visitor to at least one child node of the node.

16. The system according to claim 10, further comprising:
    prior to transforming the expression associated with the node, determining whether transforming the expression associated with the node will result in a loss of precision.

17. The system according to claim 10, further comprising:
    determining whether at least one node within the data structure representative of the data request is suitable for being transformed by the cooperative visitor.

18. A computer-readable storage device storing instructions for performing a method, the method comprising:
    receiving a data request;
    generating a data structure representative of the data request, wherein the data structure comprises at least one node;
    extracting metadata from a node of the data structure;
    querying a repository to determine a cooperative visitor associated with reflection metadata based on the extracted metadata, the cooperative visitor comprising logic;
    processing the node by applying the logic of the determined cooperative visitor;

generating a chain of visitation comprising a log of control transfers associated with one or more cooperative visitors;
determining a failure in the processing of the rewritten node; and
identifying, from the chain of visitation, an error in the log of control transfers, wherein the error is associated with the failure in the processing of the rewritten node.

* * * * *